United States Patent [19]
Amberg et al.

[11] Patent Number: 5,966,292
[45] Date of Patent: Oct. 12, 1999

[54] POWER BUS SYSTEM IN A TOWER BUILDING BLOCK SYSTEM

[75] Inventors: Mark Frederick Amberg, Littleton; Thomas Alvin McKoon, Monument; Dwayne Howard Swanson, Westminster, all of Colo.

[73] Assignee: Digital Equipment Corporation, Houston, Tex.

[21] Appl. No.: 08/884,938

[22] Filed: Jun. 30, 1997

[51] Int. Cl.[6] ....................................... H05K 7/10
[52] U.S. Cl. .................. 361/733; 361/730; 361/736; 361/796; 361/788; 439/61
[58] Field of Search ................................ 361/729–733, 361/736, 741, 742, 744, 796, 802, 807, 809, 788, 775; 211/41.01; 439/61, 377; 364/708.1

[56] References Cited

U.S. PATENT DOCUMENTS 4,401,351  8/1983  Record ..................................... 361/729

*Primary Examiner*—Donald Sparks
*Attorney, Agent, or Firm*—Hamilton, Brook, Smith & Reynolds, PC

[57] ABSTRACT

In a modular tower building block system for containing computing system devices, a power bus is incorporated into the modular blocks of the building block system by using a printed circuit board to carry the power bus in each modular block. The printed circuit board is mounted and positioned in each modular block to electrically connect with a printed circuit board in a next adjacent modular block when two modular blocks are stacked on each other. Also, there are a plurality of three-phase power buses on the printed circuit boards and only one phase of each power bus is distributed from each modular block. The printed circuit board is precisely located in each modular block at a predetermined position. Alignment pins and receivers provide alignment between stacked modular blocks to precisely position one modular block to the other modular block. This also aligns electrical connectors on the printed circuit boards of the stacked blocks so that the connectors on the printed circuit boards from two blocks mate when the two blocks are stacked.

11 Claims, 9 Drawing Sheets

POWER BUS SYSTEM IN A TOWER BUILDING BLOCK SYSTEM

CROSS-REFERENCE TO RELATED APPLICATIONS

The following copending, commonly-assigned patent applications describe a tower building block system for storing computing system devices. The tower building block system is used with the preferred embodiment of the present invention. The applications are hereby incorporated by reference.

1. "Tower Building Block System" invented by Mark Amberg et al, U.S. patent application Ser. No. 884/986 filed Jun. 30, 1997 now U.S. Pat. No. 5,897,400.

2. "Input/Output Bus System In A Tower Building Block System" invented by Mark Amberg et al, U.S. patent application Ser. No. 08/884,777 filed Jun. 30, 1997.

BACKGROUND OF THE INVENTION

1. Field of the Invention

This invention relates to a power bus in a tower containing computing system devices. More particularly, this invention relates to the design of such a bus as integrated into building blocks used to build the tower.

2. Description of Related Art

Modular towers for storing computing system devices offer the advantage of providing only exactly the amount of space required to contain the computing system devices. As more devices are added, a module of the tower is added to accommodate the additional device.

An on-going problem with regard to towers, racks or cabinets that contain computing system devices stems from the plurality of power cables of different lengths that are required to distribute power to the devices. The cables are unwieldy and difficult to fit into the tower. The cables are often the wrong length for the required connection. In order to reconfigure the physical layout of the computing system, the user may have to replace many cables. To be able to physically change or add to the system the user may have many unused power cables in his inventory. This is expensive and a further waste of space in storing unused equipment.

A modular tower system provides the ability to adjust the physical size of the computing system to the amount of space required to store the computing system devices. What is needed is a solution to the above problems of powering the computing system devices.

SUMMARY OF THE INVENTION

In accordance with this invention, the above problems in a modular tower system containing computing system devices have been solved by incorporating the power bus into the modules of the tower system. In a modular tower building block system the power bus is incorporated into modular blocks of the building block system by using a printed circuit element to carry the power bus in each modular block. The printed circuit element is mounted and positioned in each module to electrically connect with a printed circuit element in a next adjacent modular block when two modular blocks are positioned adjacent to each other.

As another feature of the invention, there are a plurality of three-phase power buses on the printed circuit elements and only one phase of each power bus is distributed from each modular block. In yet a further feature of the invention, the printed circuit element is precisely located in each modular block at a predetermined position relative to alignment positioning elements in the modular block. Positioning elements provide alignment between adjacent modular blocks to precisely position one modular block adjacent the other modular block. This aligns the printed circuit elements of the adjacent blocks for connection from the printed circuit element in one modular block to the printed circuit element in the other modular block.

The great advantage and utility of the present invention is the power bus is incorporated into the building block system. Accordingly, when building blocks are assembled to accommodate more computing system devices, additional power bus is provided at the same time. The foregoing and other features, utilities and advantages of the invention will be apparent from the following more particular description of a preferred embodiment of the invention as illustrated in the accompany drawings.

DETAILED DESCRIPTION OF PREFERRED EMBODIMENTS

Figure 1:
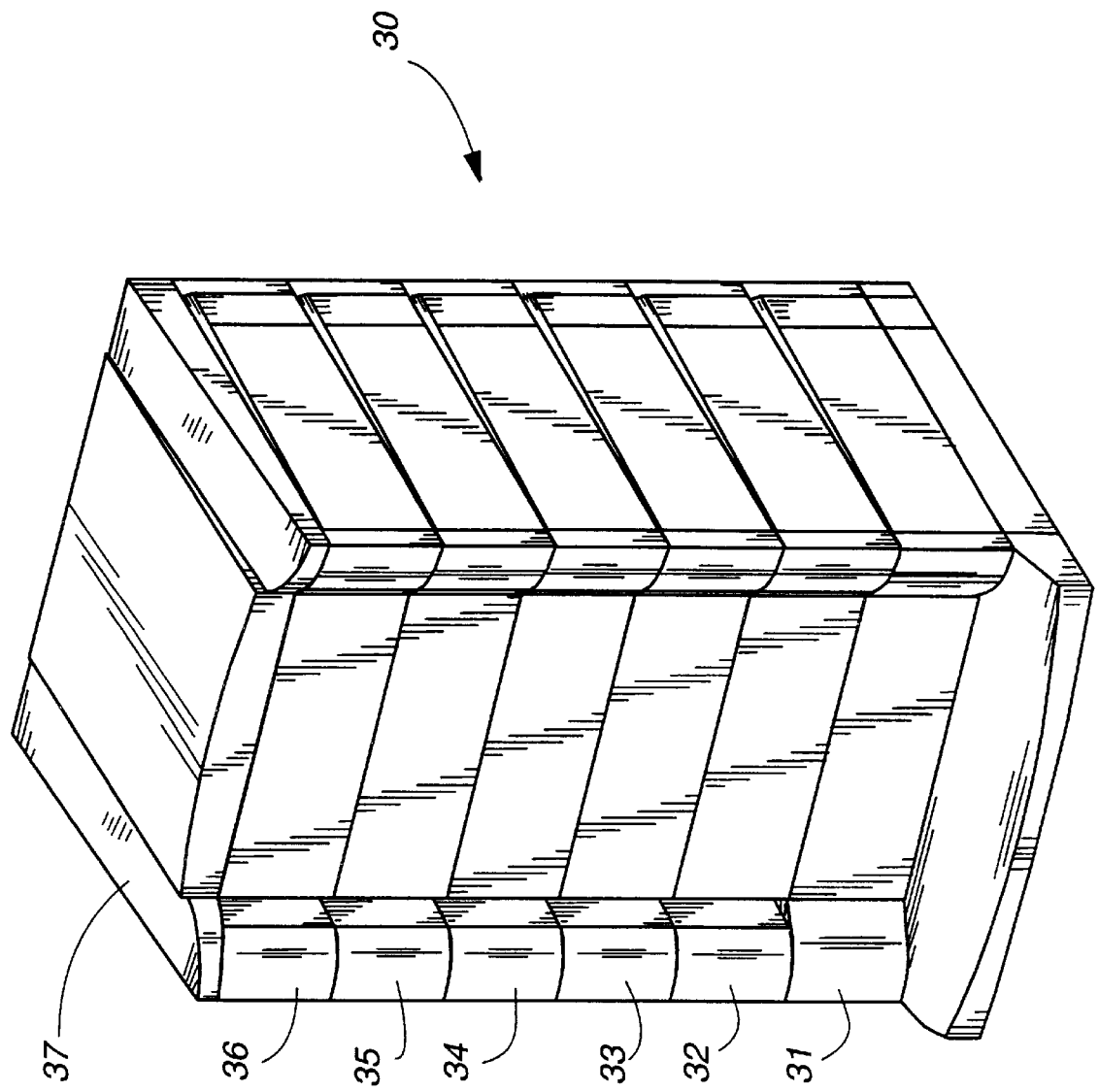
FIG. 1 is an overall isometric view of an environment for the present invention and includes a tower composed of a base unit, five shelf units and a cap unit.

FIG. 1 shows a tower assembly 30 of electronic modules composed of a base unit 31, five tower building block units 32–36, and a cap unit 37. Each of these units is covered by a cosmetic panel and the details of their structure hidden by those panels is discussed in greater detail below. Also, as is evident from the description presented in the copending application referenced above, the assembly 30 could include a greater or lesser number of block units similar to 32–36.

Figure 2:
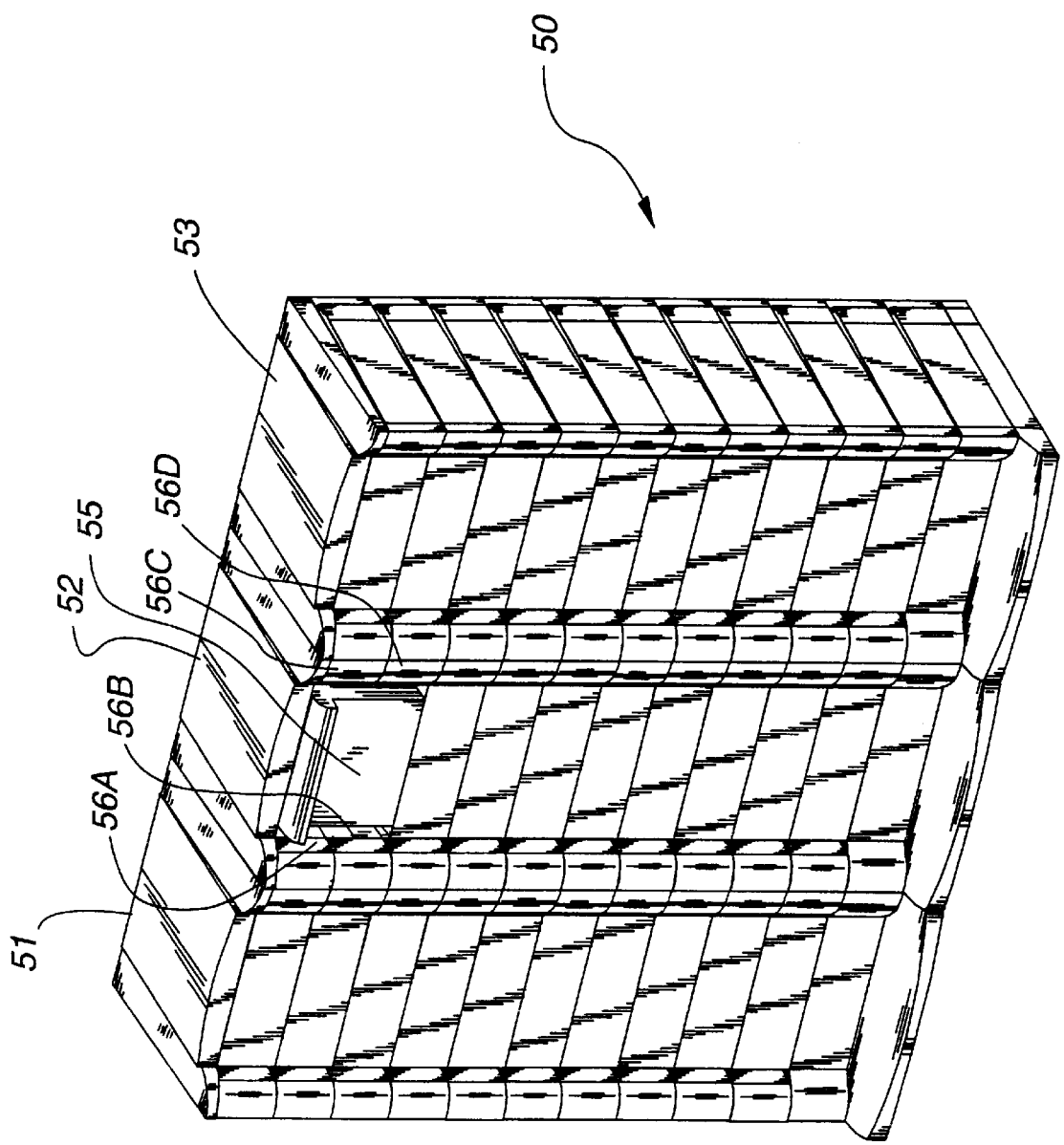
FIG. 2 is an overall isometric view of three towers with ten modules on the outer towers and a double shelf unit in the middle tower.

For instance, FIG. 2 presents an arrangement 50 of three racks 51, 52 and 53 either free standing or attached to each other. Racks 51 and 53 are composed of ten block units in addition to their base and cap units whereas rack 53 is composed of nine block units plus the base and cap units. There is no limit to the number of block units a rack can contain although safety requirements might dictate attachment of the base unit to the floor or other physical restraints of the racks.

Cap units 13 and 51–53 typically include latch elements to mate with the blocks of each column and lock them in place relative to one another. However, these caps are not absolutely necessary under all circumstances. For instance, if the electronic module attached between tower block units is adequately secure to provide a cross-bracing function, such separate caps can be omitted, although use of connector covers or even cosmetic cover panels on the topmost block pair could complete EMI isolation and/or could prevent fouling of the electrical connectors or the interior of either column of blocks.

Rack 52 includes a double sized block element 55 which is supported by four tower building blocks 56A, 56B, 56C and 56D. Such a procedure allows use of common sized tower building blocks. However, those having normal skill in the art will recognize that single tower building blocks could replace blocks 56A and 56B, as well as a single block for 56C and 56D but with those single blocks twice the size of each of blocks shown.

Figure 3:
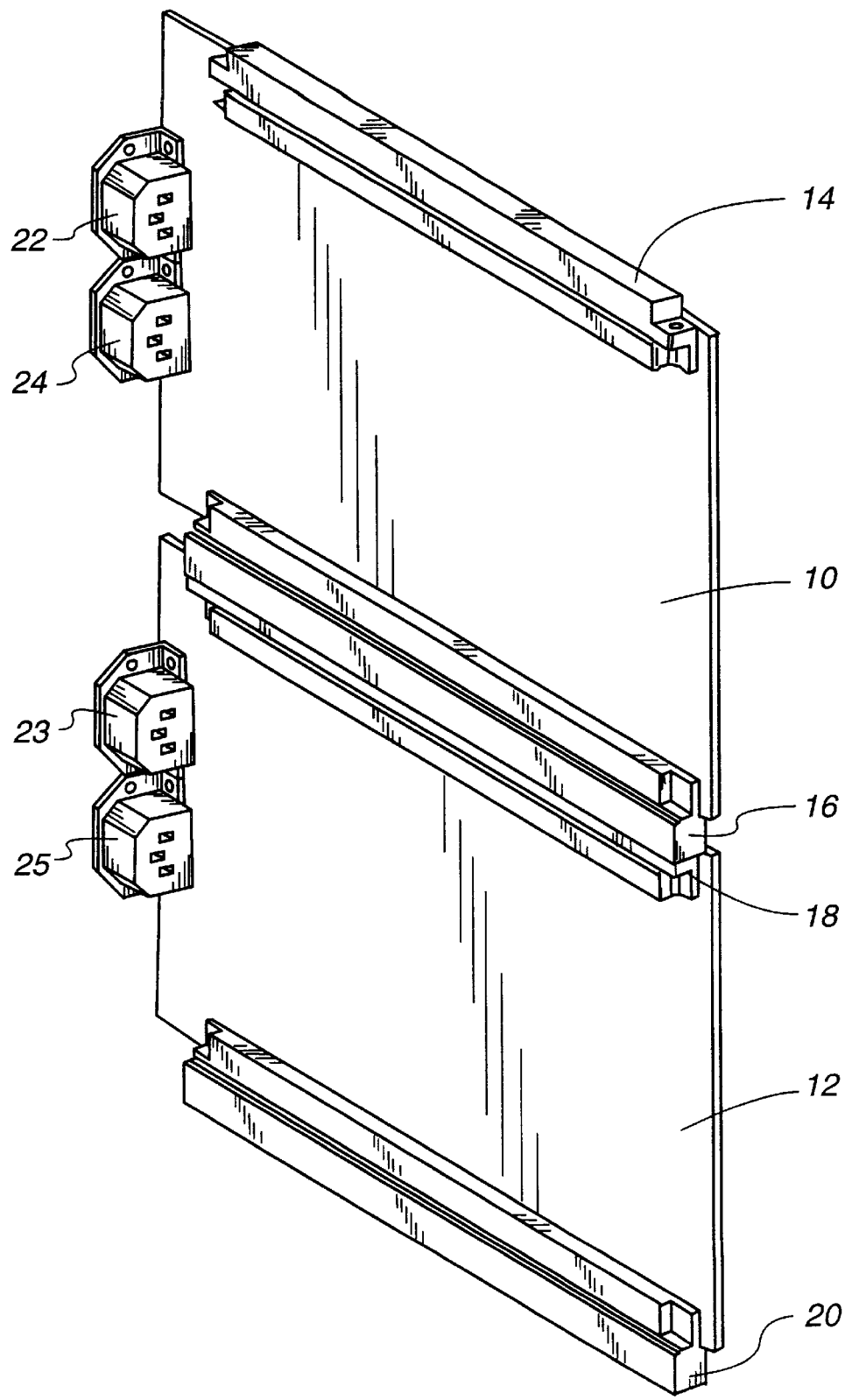
FIG. 3 shows two printed circuit boards interconnected to implement a preferred embodiment of the invention where power buses are passed up the tower building block system.

In FIG. 3, the modularized power bus in the preferred embodiment is placed on a Printed Circuit Board (PCB). Two printed circuit boards 10 and 12 are shown in FIG. 3. Each printed circuit board has a female connector at the top and a male connector at the bottom. The male connector has a shroud mounted around the pins, and therefore the pins are not visible in FIG. 3. Female connector 14 (pin receptacles also not shown) is at the top of printed circuit board 10, while male connector 16 is at the bottom of printed circuit board 10. Similarly, female connector 18 is at the top of printed circuit board 12 and male connector 20 is at the bottom of printed circuit board 12. Printed circuit board 10 is connected to printed circuit board 12 through male connector 16 and female connector 18.

Each Printed Circuit Board (PCB) is mounted in a module or building block of the tower building block system. Accordingly, when the building blocks are connected together, the connectors mate as shown in FIG. 3 between connectors 16 and 18. The alignment for obtaining proper mating of the connectors will be described hereinafter. The connectors used with the PCB in the particular example shown are not self-aligning connectors. Instead, the PCBs are precisely mounted in the building blocks and building blocks themselves have guide pins and receiving holes. These guide pins and receiving holes guide the tower building blocks into place and, at the same time, guide the mating of the connectors for the PCBs mounted in the building blocks. Double connectors, male and female, have been shown. Alternatively, other arrangements such as printed circuit board edge connectors could be used as shown in FIGS. 7A and 7B described hereinafter.

At the side of the printed circuit board 10 and 12 are two power bus outlets. There are two, three phase power buses on the printed circuit boards. Power outlets 22 and 24 on board 10 are connected to provide one phase of power from each of two power busses on board 10. Likewise, power outlets 23 and 25 on board 10 are connected to provide one phase of power from each of two power busses on board 12.

As described above, the tower building block system has two columns, or towers, with a shelf of computing system devices mounted between blocks at the same level between the two columns. In the building blocks of one tower, are mounted the input/output bus printed circuit boards. In the building blocks of the second tower, are mounted the power bus printed circuit boards.

Figure 4:
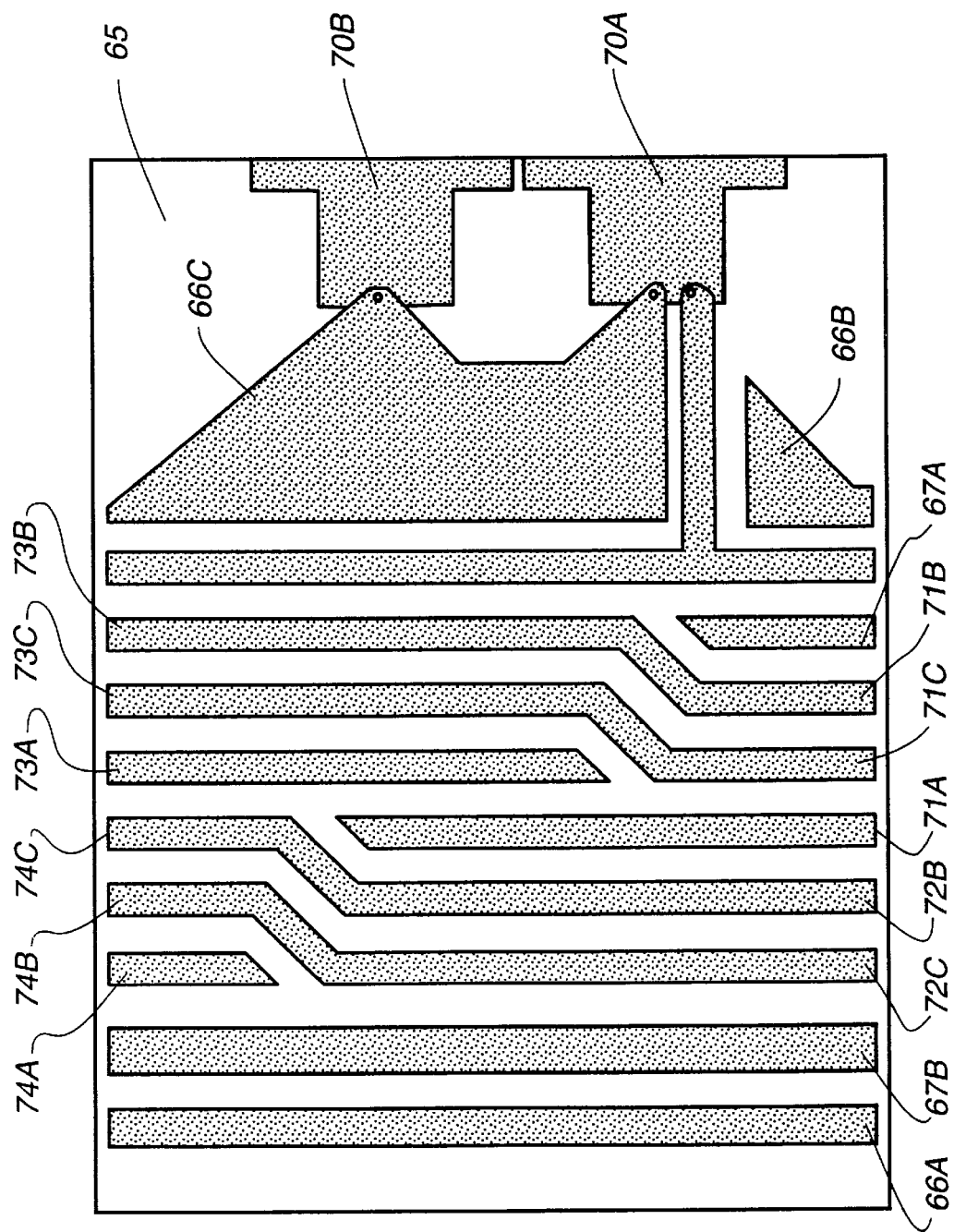
FIG. 4 is a layout view of a printed circuit board having a pair of three phase AC power connections arrayed thereon.
Figure 7A:
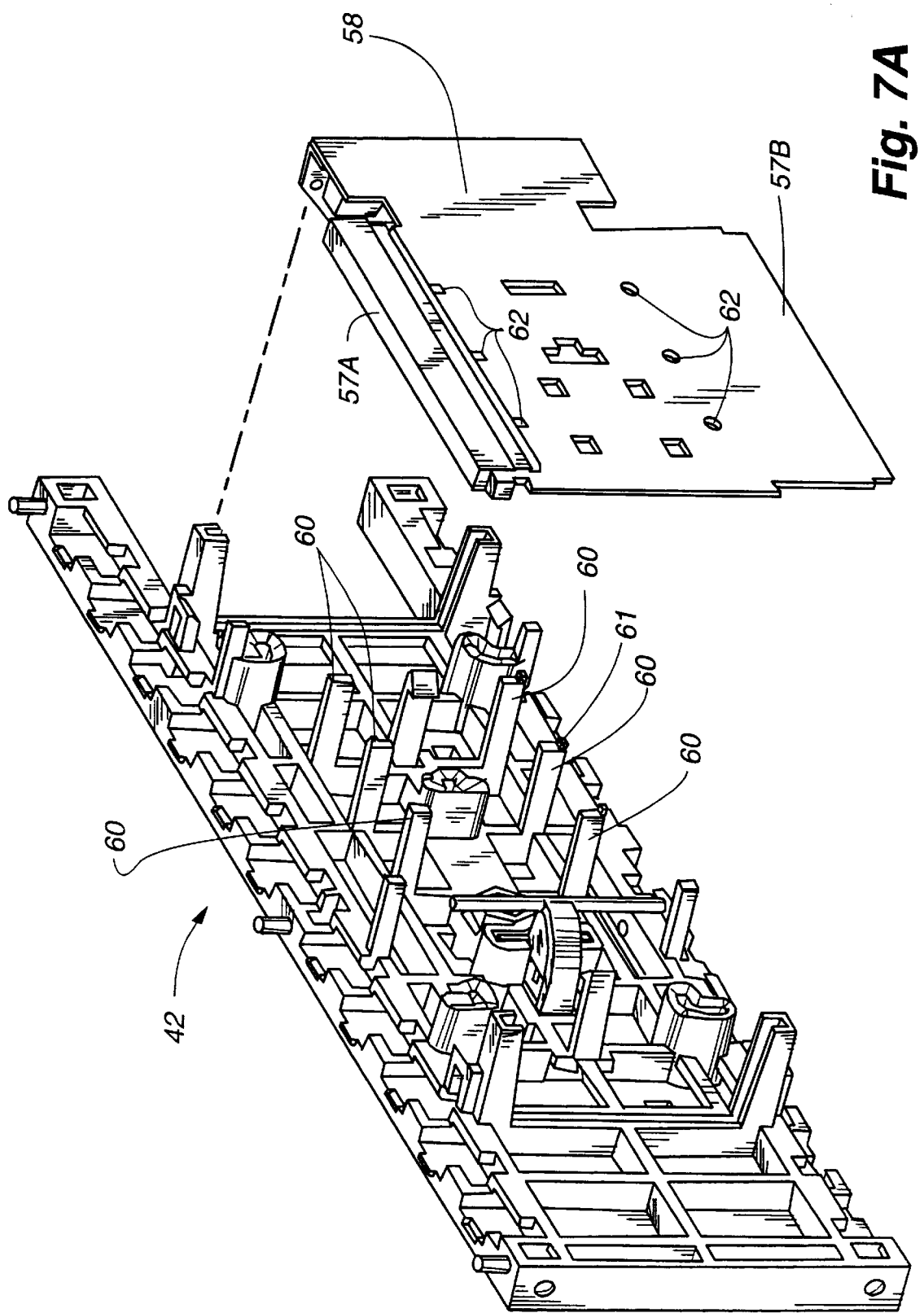
FIG. 7A shows a printed circuit board and posts on one wall of the building block for precisely locating the power bus printed circuit board.
Figure 7B:
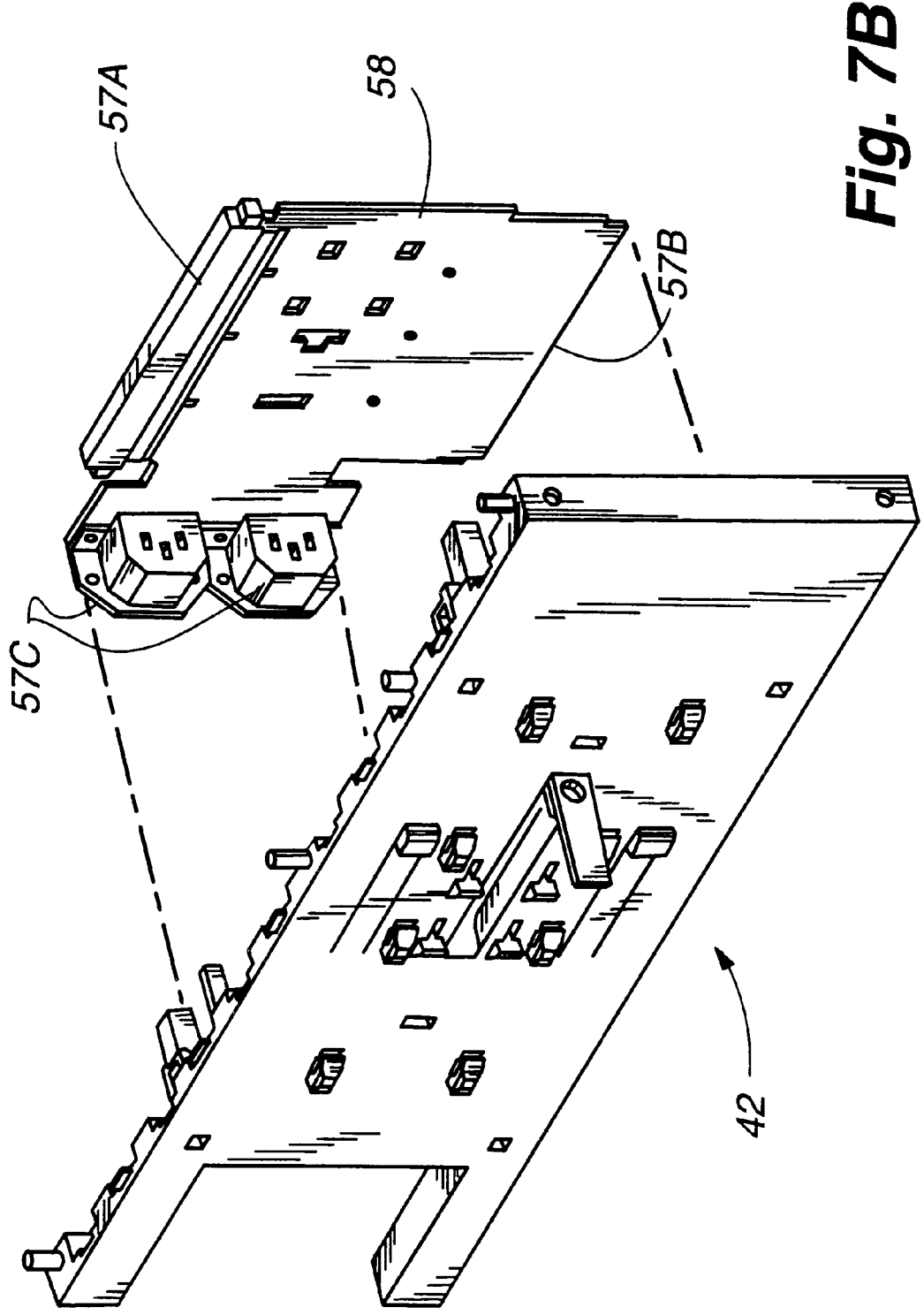
FIG. 7B shows the printed circuit board and wall of FIG. 7A from the reverse side of the wall and illustrates the power bus outlets on printed circuit board 58.

FIG. 4 is a somewhat generalized layout diagram for a printed circuit board along the lines of board 10 or 12 in FIG. 3 or board 58 in FIG. 7A. The board base 65 has a series of electrical conductors formed thereon as shown and also on the reverse side of the board for the purpose of effecting the electrical connections schematically illustrated in FIG. 5. The conductors of FIG. 4 include ground connections 66A, 66B and 66C while the primary power source neutral is connected to conductor 67A and the secondary power source neutral is connected at 67B. The three phases of the primary power are connected to conductor strips 71A, 71B and 71C while the secondary three phases of power are connected to 72A, 72B and 72C.

Figure 5:
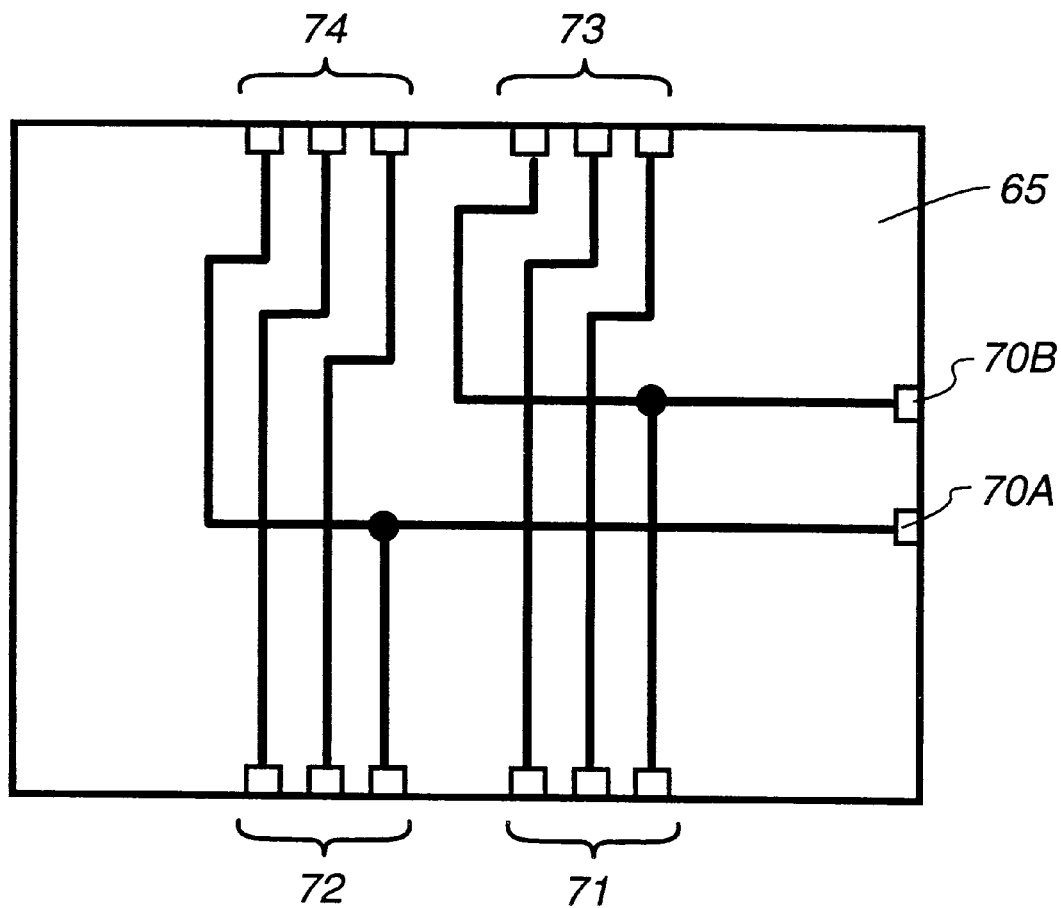
FIG. 5 is a simplified circuit diagram of the three phase connections associated with the printed circuit board of FIG. 4.

The conductors are likewise connected to the equipment module retained by the associated block through an IEC connector as at 70A and 70B. The power connections for the phase attached to the unit is transferred to the IEC connector on the reverse side of base 65 and as shown in FIG. 5. Note that, if desired, power from another phase or power from all three phases of either or both power sources can energize the equipment module through appropriate IEC connections and etched conductors. Of course, shorting of all three phase lines and introduction of a single phase power source is possible especially through the base unit in which case it is possible to employ the conductors as shown in both FIG. 4 and FIG. 5 without modification.

Note that FIG. 5 illustrates connection of power from phase A of both power sources to IEC connector contacts 70A and 70B. Under those circumstances, the reverse side of board 65 would include a conductor for coupling the neutral line of the secondary power source to the IEC connector 70B.

Note further that the board 65 reverse side conductors likewise shift each of the three phases of both the primary and secondary power sources by one place at the output connections 73 and 74 for the next block as compared to the input connections 71 and 72. That is, the first phase at 71A is actually coupled to an output terminal via conductor strip 73A while 71B and 71C are respectively shifted into conductors 73B and 73C as shown. This facilitates automatic distribution of the loads presented by the equipment modules amongst the various phases of the different power sources.

The board of FIG. 4 is often set up to couple a single phase of power to the equipment module held in place by the particular block retaining board 65. In many circumstances, a single phase of power is all that the equipment module demands. Typically, these modules are contemporary disk drives, tape drives, data processors, controllers, and the like.

Figure 6:
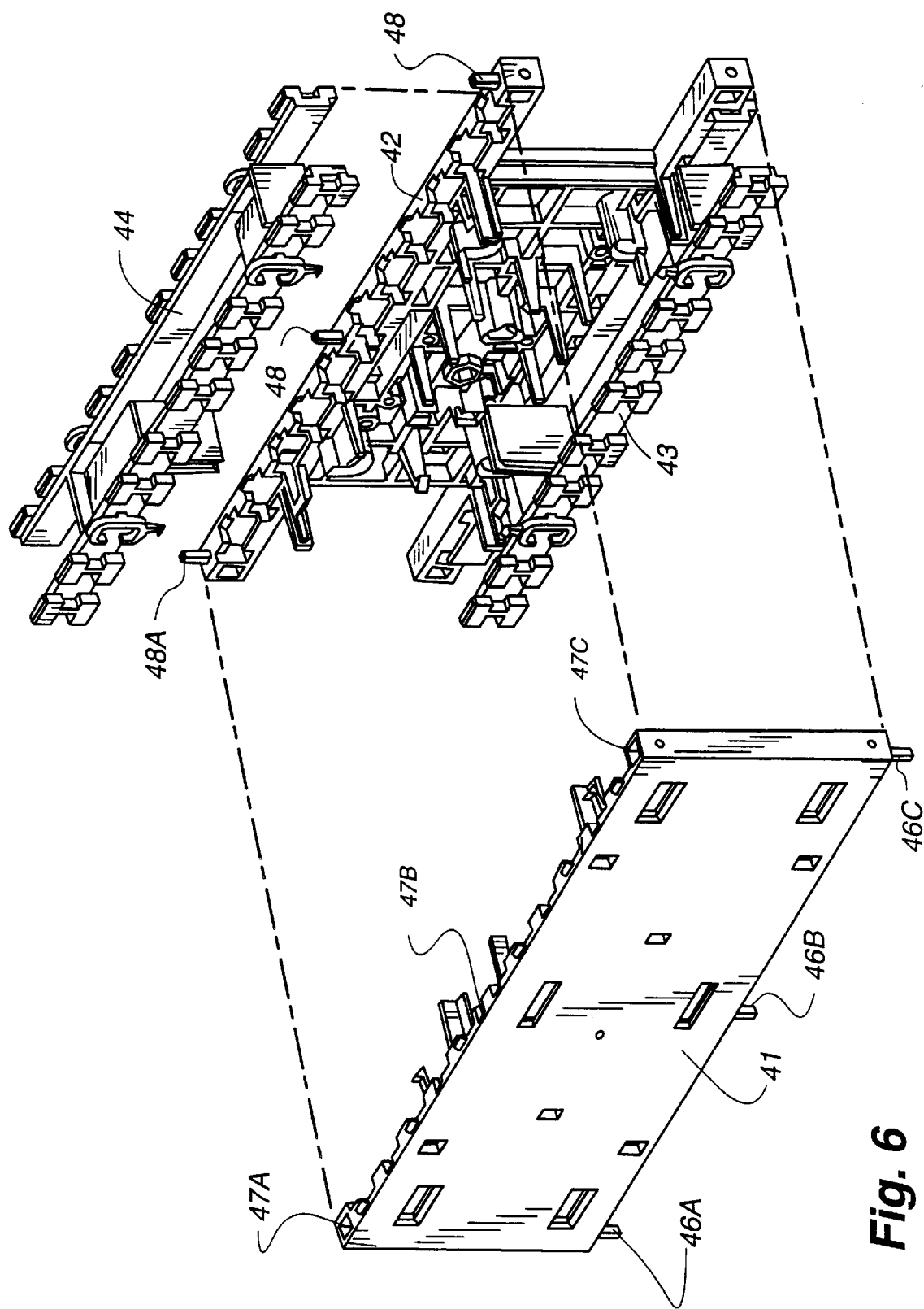
FIG. 6 shows alignment pins and receivers in a tower building block into which a power bus printed circuit board is mounted.

FIG. 6 shows one tower building block with an upper latch element and a lower latch element to fasten the building block to the next higher or lower block respectively. The building block is made up of walls 41 and 42 which are shown exploded apart in FIG. 6. Lower latch element 43 is shown fastened to wall 42. Upper latch element 44 is shown above wall 42. Before walls 41 and 42 are snapped together to form a tower building block, one of latch elements 43 or 44 is normally secured in place and a power bus printed circuit board is fastened to wall 42 at a precise location in the building block.

FIG. 7A shows a power bus printed circuit board 58 exploded away from wall 42 of the building block. Printed circuit board 58 is attached to posts 60 molded into wall 42. Printed circuit board 58 is using a board edge type of electrical connector 59. Posts 60 have small registration posts 61 or pins at their tops that engage holes 62 in printed circuit board 58. The registration posts 61 snap into holes 62, or alternatively serve to register the position of PCB 58 in place until wall 41 snaps into wall 42. In the latter embodiment, wall 41 has spacers to hold PCB 58 on posts 60 when the walls snap together. In any case, posts 60 with registration posts 61 engaging holes 62 serve to precisely locate PCB 58 relative to alignment posts and alignment receivers on the walls 41 and 42 of the building block.

In FIG. 7B, wall 42 and PCB 58 are shown as viewed from the other side of wall 42 as shown in FIG. 7A. Power bus PCB 58 uses an edge connector 57A (slot in top of connector to engage edge of next board not shown). Edge 57B has printed circuit pads to engage and electrically connect the power bus on the board to edge connector on the next lower power PCB. Power outlets 57C are the power connectors for providing power to computing system devices mounted on the shelf that will be fastened to wall 42 of the tower building block.

In FIG. 6, wall 41 of the building block has alignment posts or pins 46A, 46B and 46C at the bottom of wall 41. The top of wall 41 has alignment receiving holes 47A and 47C and receiving slot 47B. Similar alignment posts and alignment receivers are on wall 42. However, the alignment posts are at the top of wall 42, and the alignment receivers are at the bottom of wall 42. Only alignment posts 48 are visible for wall 42.

When one building block is stacked on the next lower building block, then alignment posts 46 of wall 41 in the upper block engage alignment receivers 47 in the lower block. Likewise alignment pins 48 of wall 42 in the lower block engage alignment receivers in the upper block. In this way, two blocks are physically mated. The alignment posts and alignment receivers, either or both, have tapered surfaces to assist the initial alignment and mating of the posts in the receivers.

At the same time, since board 58 is precisely positioned in each building block, the edge connector 57A of board 58 in the lower building block will be properly aligned with the edge 57B of the board 58 in the upper building block. Thus, the electrical connection elements also are aligned and mated so that the electrical connection between boards is made. If male and female connectors are used as in FIG. 3, the male connector is at the bottom of board 58 and the female connector is at the top of board 58. The connectors are guided into alignment by alignment posts and alignment receivers on the walls of the building blocks.

After, the building blocks are physically mated by vertical movement of one block onto the other block, the latch element 43 slides horizontally to fasten and hold the stacked blocks together. The tower building blocks and the mechanism for stacking the building blocks is described in detail in cross-referenced co-pending patent application entitled "Tower Building Block System."

Figure 8:
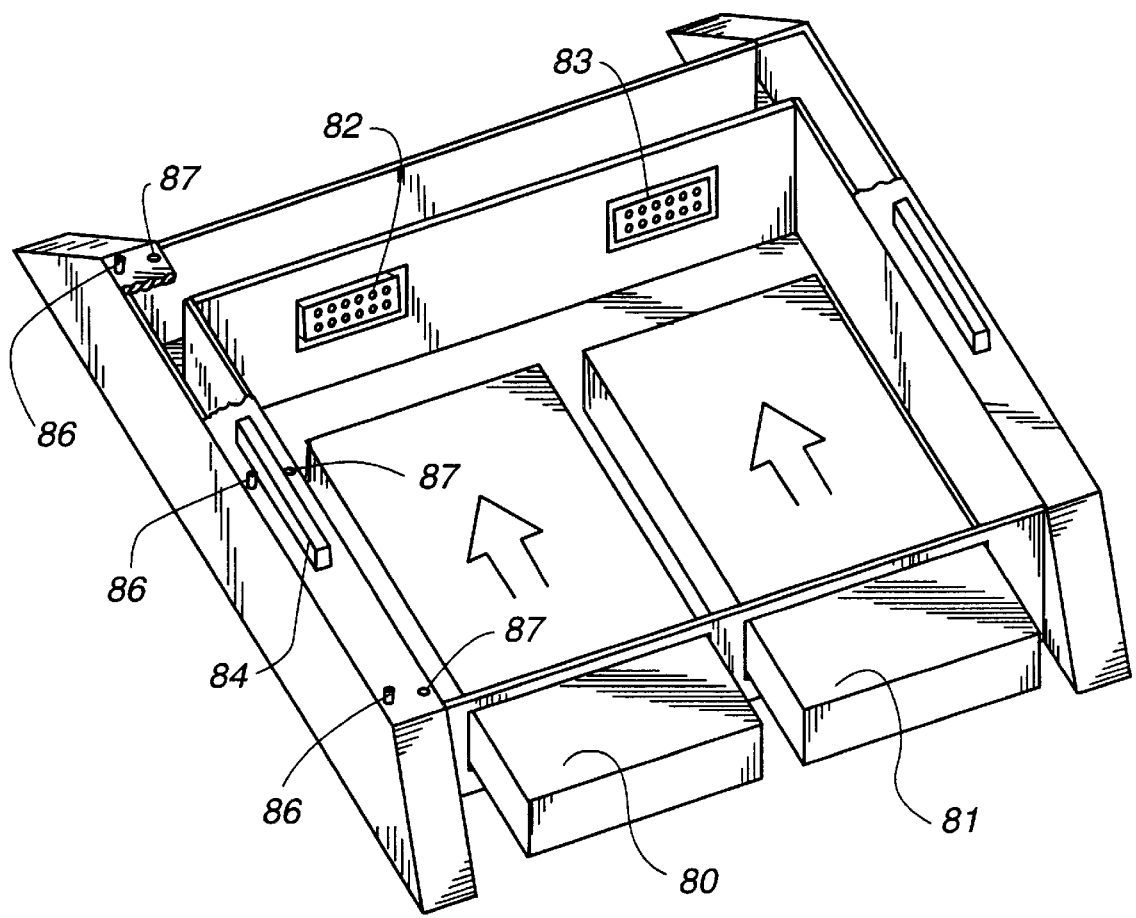
FIG. 8 shows the base of the tower building block system with the power entry units and connectors in the base.

In FIG. 8, the base 85 of the tower building block system is shown with power entry units 80 and 81. The power entry unit 80 provides the three phase power for one of the power buses and power entry unit 81 provides the three phase power for the other power bus. Each power entry unit 80 and 81 has a connector (not visible) on the back of the power entry unit that mates with connector 82 and 83, respectively. Conventional power cables (not shown) connect connectors 82 and 83 to power bus connector 84. Also, not shown is a connection from power entry units 80 and 81 to an external power source. Power bus connector 84 mates with the power bus connection on the power bus PCB in the lower most building block when the building block is stacked and latched onto the base 85.

Alignment pins 86 and alignment receivers 87 are provided on base 85 to guide the mating of a building block to the base. Connector 84 is located relative to the alignment pins 86 and alignment pin receiving holes 87 so that when the building block stacks on the base, the power connection pads, or male connector, at the edge of the power bus PCB in the building block mate with edge connector 84. The alignment pins 86 and alignment receiving holes 87 are schematically shown in FIG. 8. This alignment and mating structure is embodied and functions in the same manner as described above in reference to FIG. 6.

While a plurality of embodiments for implementing the invention have been described, it will be appreciated that any number of additional variations or alterations in the elements used to implement the invention may be made and are within the scope of the invention as claimed hereinafter.

We claim:

1. In a modular building block system for containing computing system devices and comprising assembled modular blocks, apparatus for incorporating a power bus in the modular blocks of the building block system, said apparatus comprising:

a printed circuit element carrying a section of the power bus and mounted in each modular block;

and means to position each said printed circuit element in its corresponding modular block to electrically connect with a section of the power bus belonging to a printed circuit element in a next adjacent modular block when two modular blocks are assembled adjacent to each other, wherein there is a plurality of power buses on each said printed circuit element and one power bus is distributed from each modular block to a next adjacent modular block.

2. The apparatus of claim 1 including:

positioning elements providing alignment between adjacent modular blocks to precisely position one modular block adjacent another modular block and thereby align and connect a printed circuit element in said one modular block to the printed circuit element in an adjacent modular block.

3. The apparatus as in claim 1 wherein each printed circuit element comprises a three phase power bus.

4. The apparatus as in claim 3 comprising a plurality of three phase power buses, wherein only one phase of each power bus is distributed from each modular block in assembly.

5. The apparatus as in claim 1 wherein each printed circuit element comprises a single phase bus.

6. The apparatus as in claim 1 wherein said printed circuit element comprises a printed circuit board including first and second ends, and a male connector portion at the first end, and a female connection portion at the second end.

7. The apparatus as in claim 1 wherein each said printed circuit element comprises a printed circuit board including first and second ends and electrical edge connectors selectively provided at the first and second end.

8. The apparatus as in claim 7 including power connectors mounted on the printed circuit board and connected to the edge connectors for providing power to any computing system devices mounted inside a modular block.

9. The apparatus as in claim 1 wherein each modular block comprises a wall and a plurality of posts projecting from said wall inwardly into an inside portion of the modular block, said posts serving as the means to position each printed circuit element.

10. The apparatus as in claim 9 wherein each printed circuit element comprises a printed circuit board having apertures matching with and receiving the plurality of posts in assembly, so as to position each printed circuit element in its corresponding modular block.

11. The apparatus as in claim 9 wherein the posts are molded into the wall of the modular block.

* * * * *